US010629233B1

(12) United States Patent
Ngan et al.

(10) Patent No.: US 10,629,233 B1
(45) Date of Patent: Apr. 21, 2020

(54) BUMPER PAD DESIGN FOR TAMR DRIVES

(71) Applicants: SAE Magnetics (H.K.) Ltd., Shatin, N.T. (HK); Headway Technologies, Inc., Milpitas, CA (US)

(72) Inventors: Siu Yin Ngan, San Jose, CA (US); Qinghua Zeng, Fremont, CA (US); Ellis Cha, San Ramon, CA (US); Kowang Liu, Fremont, CA (US); Xuhui Jin, Sunnyvale, CA (US)

(73) Assignees: SAE Magnetics (H.K.) Ltd., Shatin, N.T. Hong Kong (HK); Headway Technologies, Inc., Milpitas, CA (US)

( * ) Notice: Subject to any disclaimer, the term of this patent is extended or adjusted under 35 U.S.C. 154(b) by 0 days.

(21) Appl. No.: 16/296,372

(22) Filed: Mar. 8, 2019

(51) Int. Cl.
*G11B 5/00* (2006.01)
*G11B 5/31* (2006.01)
*G11B 5/48* (2006.01)
*G11B 5/60* (2006.01)
*G11B 5/127* (2006.01)

(52) U.S. Cl.
CPC .......... *G11B 5/4866* (2013.01); *G11B 5/1278* (2013.01); *G11B 5/6011* (2013.01); *G11B 2005/0021* (2013.01)

(58) Field of Classification Search
CPC ................ G11B 11/10; G11B 11/105; G11B 2005/0021; G11B 5/54; G11B 5/59633; G11B 2005/3996; G11B 1/125; G11B 5/31; G11B 5/6047; G11B 11/10508; G11B 11/1051; G11B 5/39; G11B 5/3133; G11B 5/40; G11B 5/3106

USPC ...... 360/59, 75, 324, 328; 369/13.13, 13.14, 369/13.33, 13.34, 13.17
See application file for complete search history.

(56) References Cited

U.S. PATENT DOCUMENTS

| | | | | |
|---|---|---|---|---|
| 8,897,105 | B1 * | 11/2014 | Zuckerman | G11B 5/4866 369/112.29 |
| 8,929,698 | B2 * | 1/2015 | Peng | G11B 5/6088 216/24 |
| 9,111,551 | B2 | 8/2015 | Seigler et al. | |
| 9,324,351 | B2 | 4/2016 | Kong et al. | |
| 9,818,436 | B2 * | 11/2017 | Shimazawa | G11B 5/3133 |
| 9,837,112 | B2 * | 12/2017 | Yang | G11B 5/3133 |
| 2015/0332717 | A1 | 11/2015 | Hara et al. | |

* cited by examiner

*Primary Examiner* — Nabil Z Hindi
(74) *Attorney, Agent, or Firm* — Saile Ackerman LLC; Stephen B. Ackerman

(57) ABSTRACT

A PMR read/write head configured for thermally assisted recording (TAMR) includes thermally active bumper pads formed to each side of a write element to provide enhanced touchdown (TD) protection to the write head element where it emerges adjacent to the plasmon near-field spot produced by the TAMR apparatus. The bumper pads are disposed about the write head and absorb heat energy generated by active heating elements, the write current and the energy generated by the TAMR apparatus. Absorption of this energy causes the bumper pads to expand and protrude outward from the slider ABS to protect the read/write head from both intentional and unanticipated touchdown events. The PMR read/write head is then mounted on a slider and the assembly is incorporated into a hard disk drive (HDD).

12 Claims, 11 Drawing Sheets

BUMPER PAD DESIGN FOR TAMR DRIVES

1. TECHNICAL FIELD

This disclosure relates to magnetic write heads that write on magnetic recording media, particularly to an air-bearing surface (ABS) design of such write heads that offers protection against media damage and thermal erasure during dynamic events such as operating shocks, load/unload processes and emergency power-off.

2. BACKGROUND

Hard disk drives (HDD) have been increasing the recording density of the magnetic disks on which data storage occurs. Correspondingly, the thin-film magnetic heads used to write and read that data have been required to improve their performance as well. The thin-film read/write heads most commonly in use are of a composite type, having a structure in which a magnetic-field detecting device, such as a giant-magnetoresistive (GMR) read sensor is used together with a magnetic recording device, such as an electromagnetic coil inductive device. These two types of devices are laminated together and mounted on a rectangular solid prism-shaped device called a slider. The slider literally flies over the rotating surface of the disk being held aloft by aerodynamic forces at a height called the fly height (FH). The read/write head is mounted in the slider where it serves to read and write data signals, respectively, from/onto magnetic disks which are the usual magnetic recording media in a HDD. The magnetic writer portion of the read/write head is a small electrically activated coil that induces a magnetic field in a pole. The field, in turn, emerges at a narrow write gap (WG) and can change the direction of the magnetic moments of small magnetic particles, or groups of particles, embedded in the surface of the disk. If the embedded particles are embedded in such a way that their moments are perpendicular to the disk surface and can be switched up and down relative to the plane of that surface, then you have what is called perpendicular magnetic recording (PMR). The perpendicular arrangement produces a more densely packed region for magnetic recording.

Perpendicular magnetic recording (PMR) heads, which record in a direction perpendicular to the plane of the recording media, have made it possible to extend the ongoing increase in the recording density of hard disk drives (HDD) beyond 100 Gb/in2. However, even using PMR heads, it is difficult to extend the density beyond 1 Tb/in2 due to thermal stability of the media and the media's super-paramagnetic limit. In order to achieve a higher recording density, a new technology has been developed: Thermally Assisted Magnetic Recording (TAMR). Briefly, the media that can be effectively used to record at these ultra-high densities must have extremely high coercivities so that data, once it is recorded, can remain stable even when subjected to thermal effects. Unfortunately, the high coercivities required to maintain the data once it is recorded, also makes it difficult for the limited flux densities of the small PMR heads to actually create magnetic transitions and record that data into the media. One way to do this, is to heat the recording media during the actual recording process so that its coercivity is temporarily reduced and then to record the data on the heated surface. When the surface cools, the coercivity is restored to its ambient value and the recorded data becomes stable.

As is well known, a typical TAMR head is a read/write head (a slider-mounted PMR head in the present case) that is furnished with: (1) a Laser diode to provide optical thermal energy via optical radiation, (2) an optical waveguide to transfer that radiation close to the recording surface, and (3) a plasmon generator located near that surface. The plasmon generator is a device that receives the optical radiation, converts it, by electromagnetic coupling to the excitation of plasmon modes and then transfers energy from the plasmon near-fields to a region of the recording media. The near-fields, not being radiative, are not subject to diffraction effects and can be highly localized. The localized near-field energy appears as a near-field spot at the tip of the plasmon generator's air bearing surface (ABS). This tiny near field spot emerges at the ABS of the PMR read/write head adjacent to the emerging magnetic pole tip of the write portion of the PMR. During write operations, the emerging near-field spot induces a very localized temperature rise in the recording media to assist magnetic writing. At the same time, the near-field energy induces a very sharp or localized thermally-induced protrusion on the recording head that causes many issues that should be dealt with. Note that this disclosure will address the read/write head and not provide any additional description of these TAMR components that produce the near-field spot as they are now well known in the field and features of the TAMR head, where the near-field energy is deposited and the read/write operations occur.

SUMMARY

The first object of this disclosure is to provide TD protection to various portions of a TAMR write head by the addition of "active" bumper pads whose shapes are thermally modified by the effects of heat already being produced within the write head.

The second object of this disclosure is to provide such bumper pads which are caused to protrude by the effects of heat already being generated by elements within the TAMR head and wherein the protrusion increases TD contact area and can control the minimum point (closest to the disk) location so that it is away from sensor locations to improve reliability.

The third object of this disclosure is to provide such bumper pads whose global and local protrusion effects will cause points of TD contact to be shifted to shields and other regions that are designed to absorb contacts and thereby to avoid contacts with more sensitive areas of the write head.

A fourth object of this disclosure is to provide bumper pads whose shapes can be controlled to create thermal protrusion asymmetries that may be advantageous for the performance of the TAMR write head. 1.

The objects of this disclosure will be met by the design of a TAMR read/write head configured for perpendicular magnetic recording (PMR) that includes a magnetically shielded GMR read head and a separate, magnetically shielded inductive write head that is activated by a write current. These elements emerge at an ABS of the PMR. The PMR also contains independently operating heater elements, Hr and Hw, that are disposed adjacent to said read head and said write head respectively, but are proximally away from said ABS. The PMR also contains at least one HDIs (head-disk interference sensor that is mounted in the read/write head. In order to make use of the TAMR system, the write head forms a narrow writing region at its ABS where magnetic flux is emitted by an emergent magnetic pole tip and where near-field plasmon energy emerges at a trailing edge of said pole tip to enable writing on a disk medium. Finally, a pair of thermally active bumper pads, whose shapes are modified by local thermally-induced protrusions, are disposed to either side of the narrow writing region of the write element to protect said region in the event of a touchdown (TD) or other forms of head-disk interference (HDI) by shifting points of possible disk contacts away from the write head and towards the magnetic shields.

DETAILED DESCRIPTION

Figure 1A:
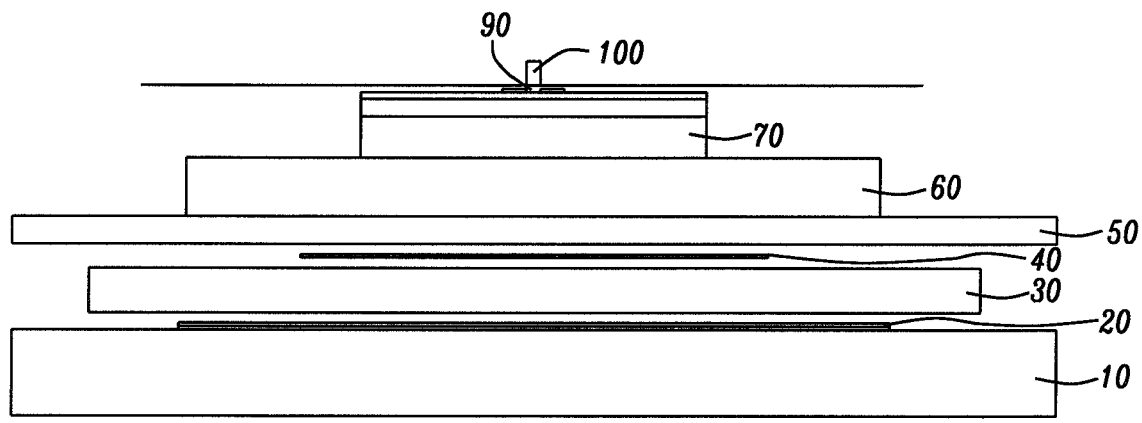
FIG. 1A is a schematic ABS view of a prior art TAMR head.

Referring to prior-art FIG. 1A, there is shown a lower read shield, 10, the read element, 20, the upper read shield, 30, the HDI sensors (HDIs) 40, a lower write shield 50, an additional pair of write shields formed on the lower write shields, the pair including a first write shield 60 and a second write shield 70, a write element (i.e., the magnetic pole tip) 90 with the near-field spot 80 being below the write element and, finally, a narrow upper write shield 100 just above the write element.

Figure 1B:
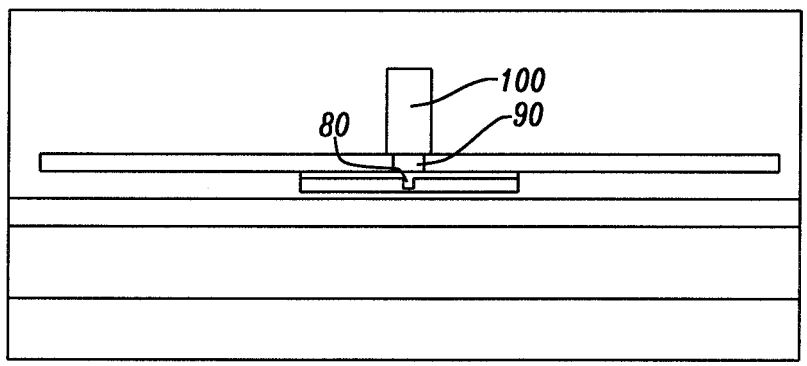
FIG. 1B is an enlarged view of the write-gap region of FIG. 1A.

FIG. 1B shows an enlarged view of the upper write shield, 100, the face of the pole tip 90 immediately below the shield and the tiny near-field spot 80 immediately below the pole 90. The near-field emerges at the ABS through an opening that is associated with the ABS end of the plasmon generator structures and they are not discussed herein.

After applying electric power to the heaters, individually or together, the pole region expands (global protrusion), and the read/write elements protrude accordingly. This protrusion is beneficial because it allows the spacing between the head and the disk to be reduced locally during reading and writing to achieve a high recording density. Typically, Hr is energized during reading of the disk, and Hw, the inductive magnetic write coil and the tiny near field spot are energized during writing on the disk. Thus, a touchdown that occurs during a read process will be called an Hr TD, because the Hr is activated during a read process and, similarly, a touchdown that occurs during a write process will be called a Hw TD. Note that the magnetic write coil is energized by a separate write current and the near-field spot is energized by the plasmon energy from the optical radiation.

The read element, 20, is located between a lower read shield 10 and an upper read shield 30. The read shields provide sufficient contact area to trigger TD vibrations in a Hr TD. The shields also provide a guard-band to protect the read element from head-disk interference (HDI) and TD wear.

Unlike the read element, the write element is not completely surrounded by write shields in the TAMR head, so that a strong magnitude field can be produced. There is only a very narrow write shield 100 on the top of the write element 90 (see either FIG. 1A or 1B). Therefore, both pre-heating effects (the activation of the Hw just before writing) and write TD contact areas are very small, as shown by the small elliptical area surrounding the write-shield 100. TD vibration, therefore, is very weak, as shown schematically in FIG. 2A. In addition to the local protrusion on the near-field spot during a write TD (a laser-induced protrusion), TD overdrive wear on write element and near field spot are a concern (FIG. 2B).

Figure 2A:
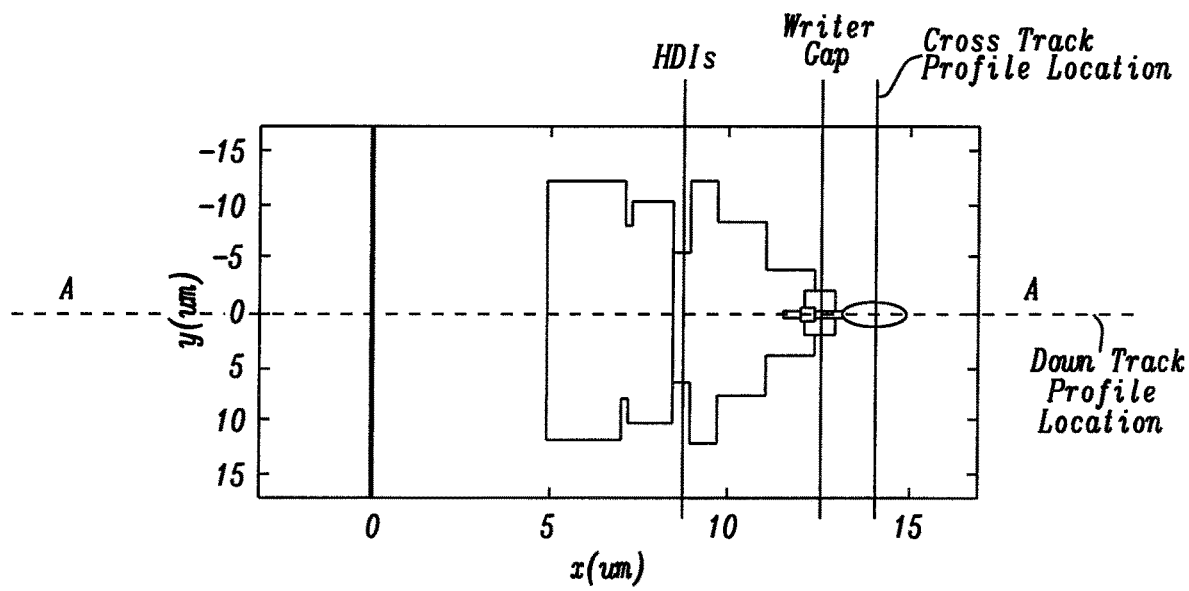
FIG. 2A is a schematic ABS view of the head in FIG. 1A showing the region of contact during a write TD.
Figure 2B:
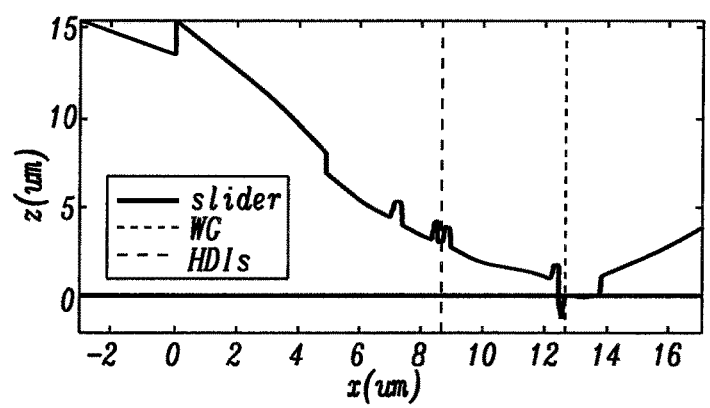
FIG. 2B is a graphical representation showing the slider fly-height profile during the write TD of FIG. 2A; vertical lines show vertical height at positions of the read-gap, the HDI's and the write-gap.
Figure 3A:
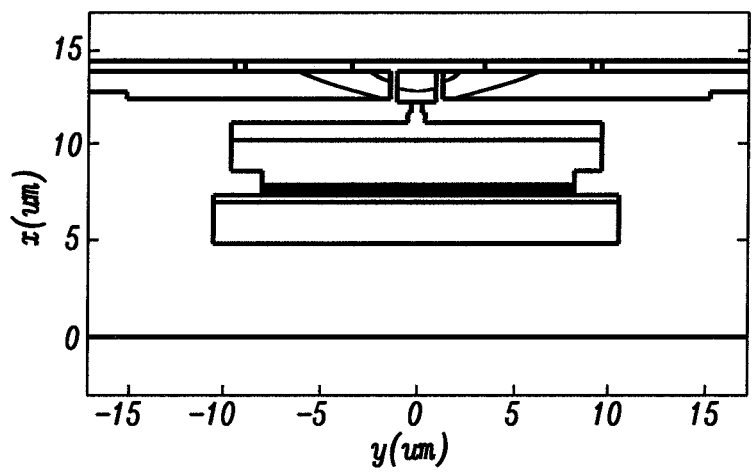
FIG. 3A is a schematic representation of the ABS structure of a TAMR head having a first particular configuration of bumpers formed to either side of the write spot. The figure shows the contact area surrounding the Hw during a write TD.
Figure 3B:
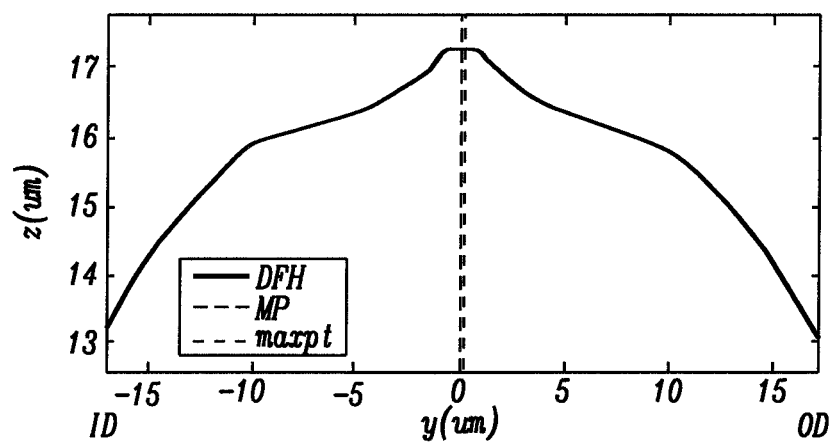
FIG. 3B is a graphical rendition of the Hw cross-track protrusion that occurs during the event of FIG. 3A.
Figure 3C:
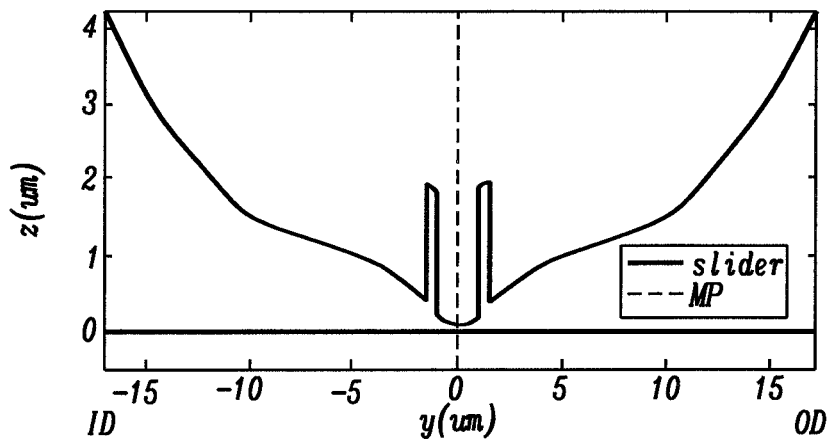
FIG. 3C is a graphical rendition of the Hw cross-track fly height profile that occurs during the event of FIG. 3A.
Figure 4A:
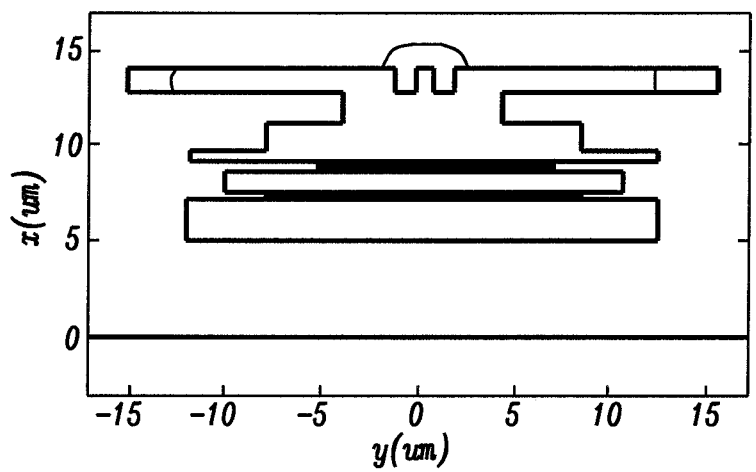
FIG. 4A is a schematic representation of the ABS structure of a TAMR head having a second particular configuration of bumpers formed to either side of the write spot. The figure shows the contact area surrounding the Hw during a write TD.
Figure 4B:
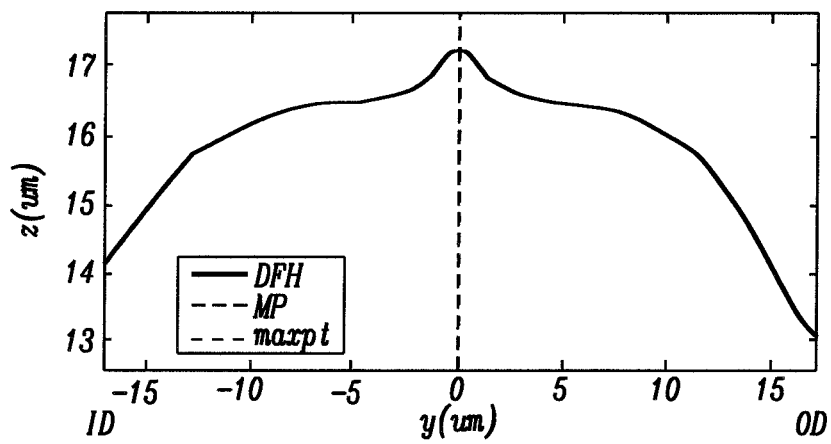
FIG. 4B is a graphical rendition of the Hw cross-track protrusion that occurs during the event of FIG. 4A.
Figure 4C:
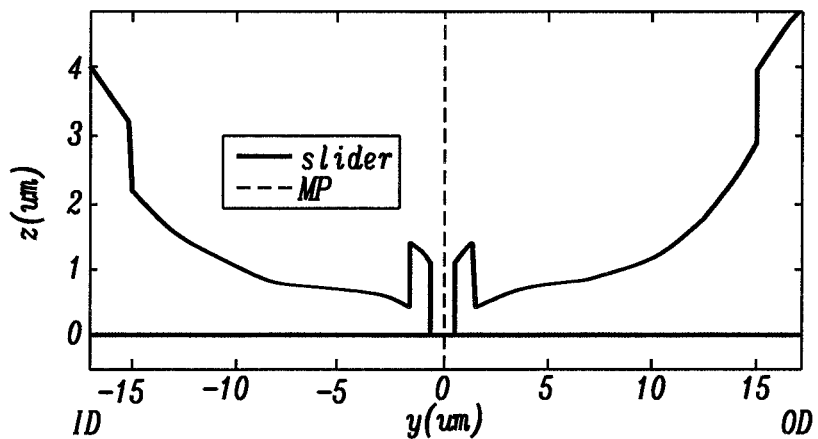
FIG. 4C is a graphical rendition of the Hw cross-track fly height profile that occurs during the event of FIG. 4A.

We refer now to FIGS. 2A and 2B which illustrate the effects of a write TD. FIG. 2A is a simplified ABS view of the TAMR head shown in FIG. 1A, indicating those portions of the head that will approach the disk surface at different heights. The x-direction in 2A is the down-track direction, the y-direction is the cross-track direction and the z-direction, which is the ordinate in in FIG. 2B, is the vertical height of the slider ABS above the disk. FIG. 2B shows a curved line indicating the spacing from the disk surface of the various parts of the slider-mounted head as a function of the down-track direction (x-direction), as the TD occurs. The two FIGS. 2A and 2B) are placed vertically above each other so that the vertical spacing of corresponding specific points of the TAMR slider-mounted head in 2A can be easily visualized on the graph in 2B. FIG. 2A shows the cross-track profile (small elliptical region), of the touch-down region of the head at about x=14 (microns), which is basically the upper shield of the write-head (shown as 100 in FIG. 1A). Slightly behind this region is the writer gap (pole tip emergence) at about x=12.5 and behind that are the HDIs, at about x=8.5 and the read gap at about x=7. This figure (FIG. 2B) represents the vertical position (fly-height) of those same various regions on the write head during a write TD.

For write element reliability and to reduce Hw TD vibration in a TAMR head, the use of side bumper pads has been proposed in the prior art. However, the particular designs of the side bumper pads that have been proposed cannot generate sufficient local protrusion to increase contact area in an Hw TD and protect write element/near field spot in HDI TD. FIGS. 3A-3C and 4A-4C show modeling results of two prior art side bumper designs (Hw contact area (A), Hw cross-track protrusion on side-bumper (3B) and Hw cross-track FH profile on side-bumper (3C)).

Figure 5A:
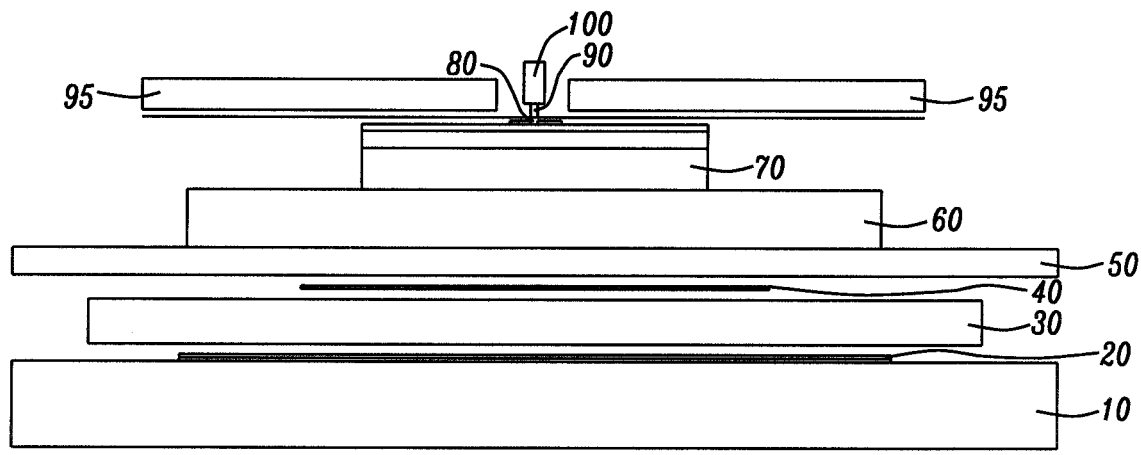
FIGS. 5A and 5B are two schematic views of the bumper-pad design of the present disclosure. 5A is a schematic ABS drawing and 5B is an isometric version of the design showing its position relative to the write coil.
Figure 5B:
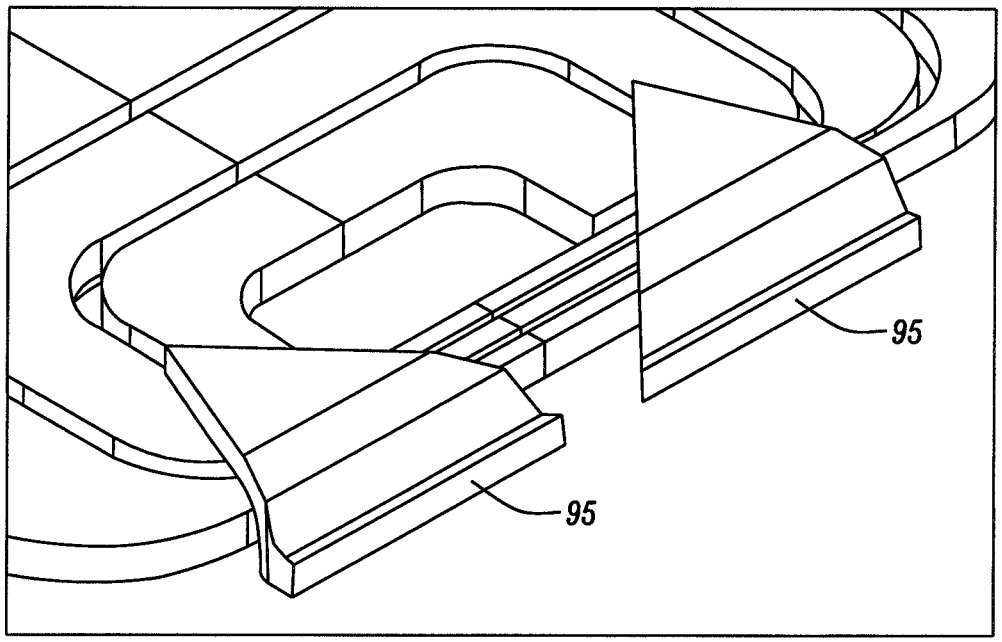
Figure 5C:
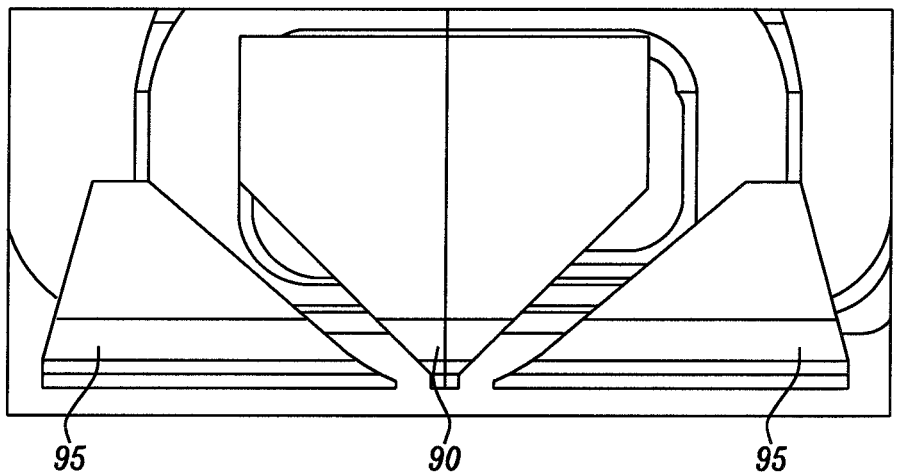
FIG. 5C is a top-down view of FIG. 5B showing the magnetic pole positioned above the conducting coil that energizes it. The active bumpers are on either side of the pole.
Figure 5D:
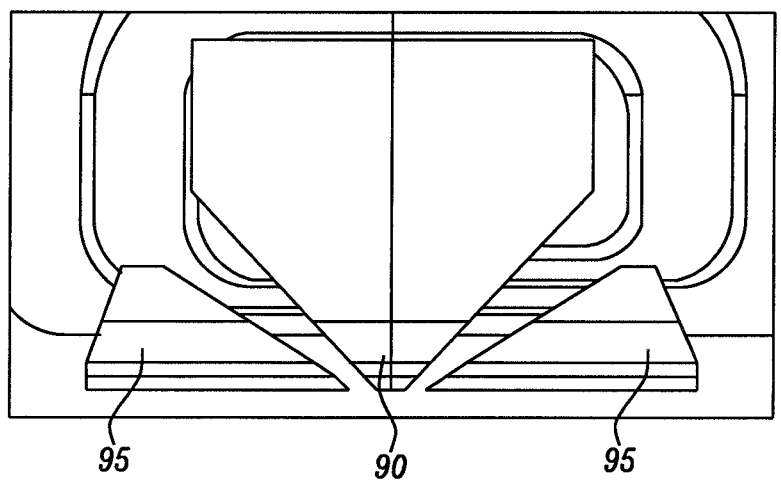
FIG. 5D is also top-down view of FIG. 5B showing the magnetic pole positioned above the conducting coil that energizes it. The active bumpers in this figure are a different design, being smaller and narrower.

Heater currents, write current and laser-induced head protrusions are all thermal protrusion effects that are used primarily to control sensor spacing above the disk surface for improving magnetic performance. The object of the presently disclosed active bumper pad design is to make use of any heat sources already inside the head (i.e., the heaters, the write current, the laser) to generate additional local thermal protrusions of the bumper pad in order to protect the near-field spot region of the write element. FIGS. 5A and 5B show the bumper pad design in both a schematic ABS view (5A) and an isometric drawing (5B) that shows some of the energizing magnetic inductive coil structure behind the ABS view in 5A. The pad extends in an in-depth (proximally away from the ABS) direction towards the write heater and passes over the write coil portions of the head to absorb heat that will generate additional local protrusion beyond global heater/writer protrusions. FIG. 5C is a schematic, top down view of the fabrication shown as an isometric drawing in FIG. 5B, but now there is also shown the main pole 90 formed over the coil windings (which are partially visible). The active bumper pads are shown as 95. For contrast, FIG. 5D is a top down view, analogous to that in FIG. 5C, but now showing a different design in which the bumper pads 95 have been given a narrower shape. It is understood that the use of mathematical modeling is an important tool in creating the desired shape for the bumper pads corresponding to a given slider design, choices of material and operational parameters.

Figure 6:
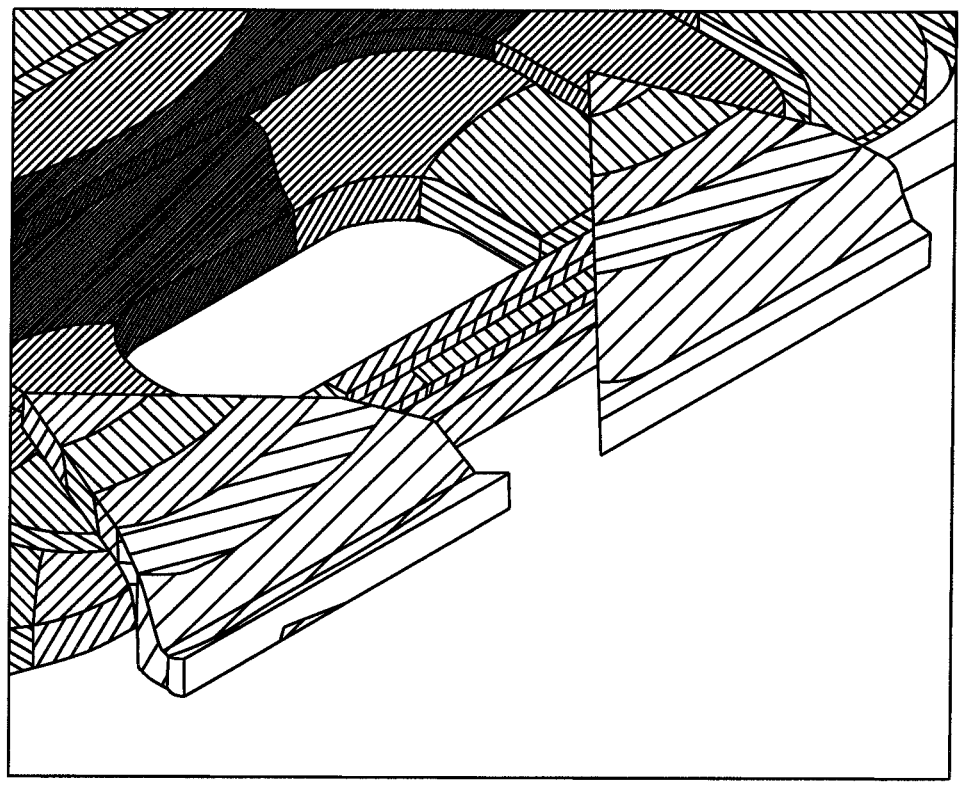
FIG. 6 is the presently disclosed bumper pad design shown in FIG. 5B, now also showing a temperature profile during simulated operation by shading various portions of the figure so that less shading indicates cooler temperatures.

Although the bumper pad design is shown as formed on a TAMR head with a particular configuration (PMR), the operation of a thermally active bumper pad is not limited to a TAMR head or to this particularly designed TAMR head. FIG. 6 shows the same (NiFe) bumper pad of FIG. 5B with a simulated temperature profile resulting from 120 mW of power supplied to the write heater Hw; denser shadings indicate higher temperatures. The results of the model and simulation in this case indicate that the range of temperatures in the section shown goes from 44.036° C. to 150.4° C. The temperature of the front surface of the bumper pad is 44.036° C., which is the coolest temperature.

Protrusions are not shown in the figure, but modeling results shown in FIGS. 7A-7C and FIGS. 8A-8B indicate exemplary protrusion shapes. It should be pointed out that materials like NiFe which have been used for the present bumper pads have high thermal conductivity and, therefore, they tend to eliminate sharp thermal gradients. This can be advantageous for designing pads that will achieve some target protrusion shape.

Figure 7A:
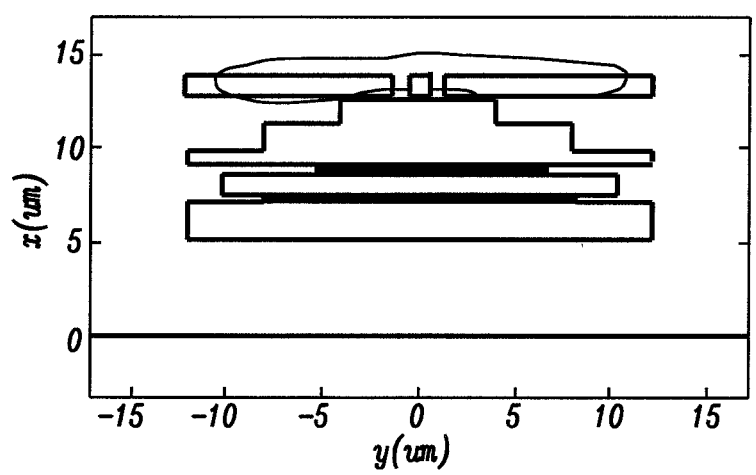
FIGS. 7A-7C are a series of illustrations showing the results of modeling the contact area of the Hw and surrounding bumper pads (7A), the cross-track protrusion of the Hw (7B) and the Hw cross-track fly-height (FH) profile (7C) during a simulated TD event.
Figure 7B:
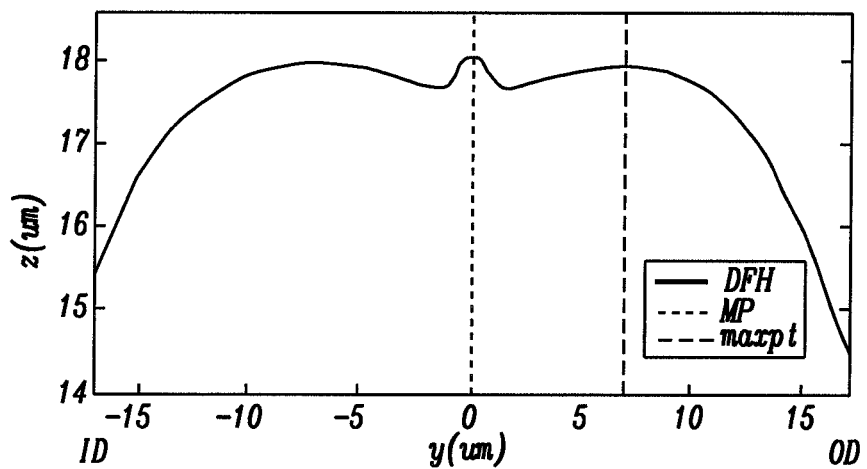
Figure 7C:
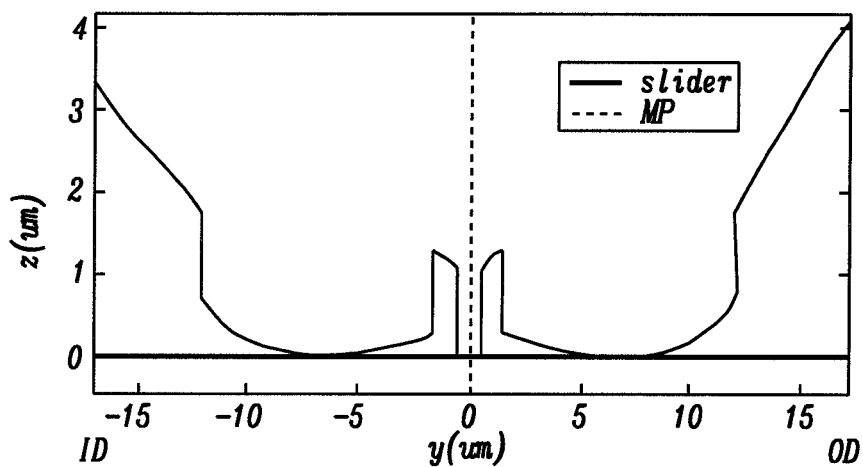

Referring now to FIGS. 7A-7C there is shown simulations of various measurements made on the performance of the present bumper design during a write TD. FIG. 7A models the schematic ABS view of the shape and extent of the Hw contact area during the TD as an irregular elongated, quasi-elliptical area that includes the main pole (MP) 90 and the bumper pads 95. FIG. 7B shows the Hw maximum cross-track protrusion (maxpt) around the main pole (MP) at y=0 caused by the protrusion of the active bumper (the two bulges to either side of the MP labeled maxpt). FIG. 7C shows the Hw cross-track fly-height (FH) profile of the slider resulting from the protrusions of the bumper pads. All three FIGS. 7A-7C) measure distance in the cross-track direction as y, in micrometers (μm). FIG. 7B measures protrusion of the Hw relative to the ABS in the z-direction also in (μm) and FIG. 7C shows the fly height (FH) profile of the slider above the disk also in the z-direction.

With the additional local protrusions of the newly designed active bumper pads, contact area (see large elliptical region in FIG. 7A) is increased significantly in pre-heat and write TDs as compared to the small circular contact area shown in FIG. 2A. Importantly, sufficient TD vibration for improved contact detection by the HDIs is also created. The symmetrical Hw bulges in FIG. 7B clearly shows the effect of the local maximum protrusion peak (maxpt) on bumper pads. As a result of the protrusion curve shown in FIG. 7B, in pre-heat and write TD the minimum point of the slider fly-height is shifted away from the write element/near field spot to the side bumper (FIG. 7C). Thus, the write element/near field spot is protected from HDI/TD wear.

Figure 8A:
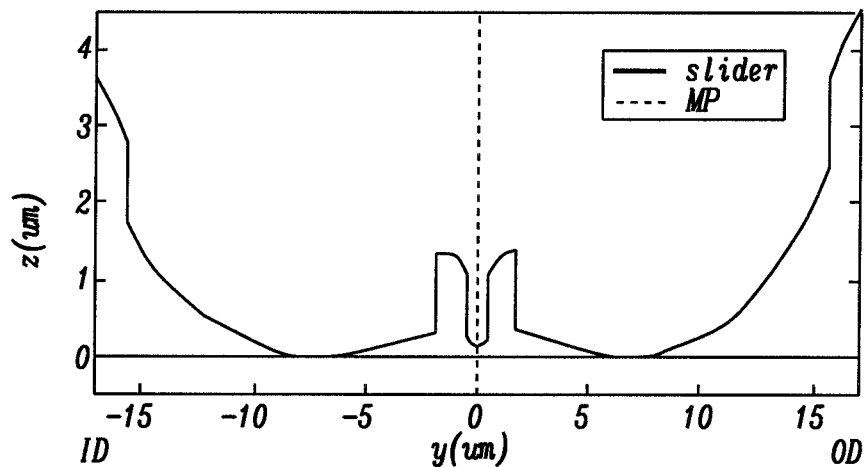
FIGS. 8A-8B show how the bumper pads can be used to make a protrusion height adjustment (8A) and a protrusion shape adjustment (8B) during the same process as simulated in 7A-7C.
Figure 8B:
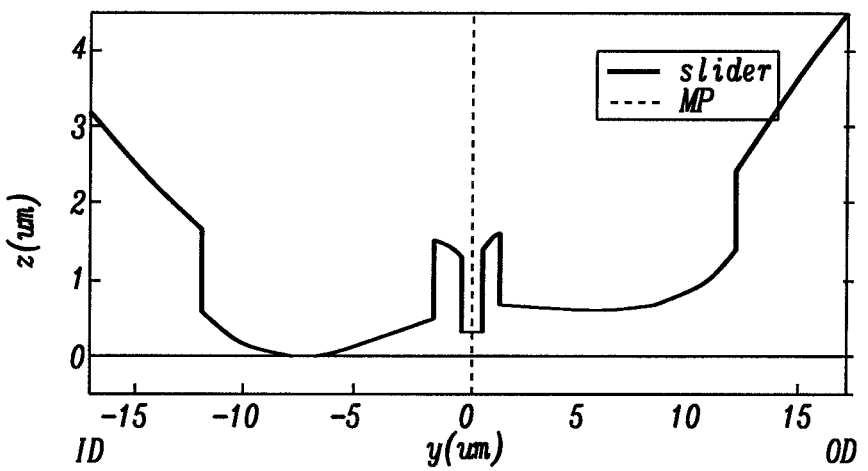

In prior art, non-active contact pad designs the contact pad height (the guard-band) is generated by pad material selection, not by the effects of local protrusion on contact pad. Thus, in the prior art, contact pad height typically depends on material selection and head construction processes. Those contact pads and bumpers are "passive," and do not change their shapes or provide any form of response dynamics during HDD operation. The present bumper pad design is "active" and generates varying local protrusions by heat generated within the head. Such a design can operate effectively in conjunction with different shield materials and head processes. The local protrusion magnitude and shape in the presently disclosed bumper pad can be adjusted by bumper pad dimensions to generate a sufficient guard-band for different wafer designs, head processes and write operation scenarios as shown in FIGS. 8A and 8B. In addition, as shown in FIG. 8B, the bumpers can be formed with small asymmetries which will produce corresponding asymmetries in the protrusion profile that can compensate for various performance variations in the read/write head designs.

Figure 9:
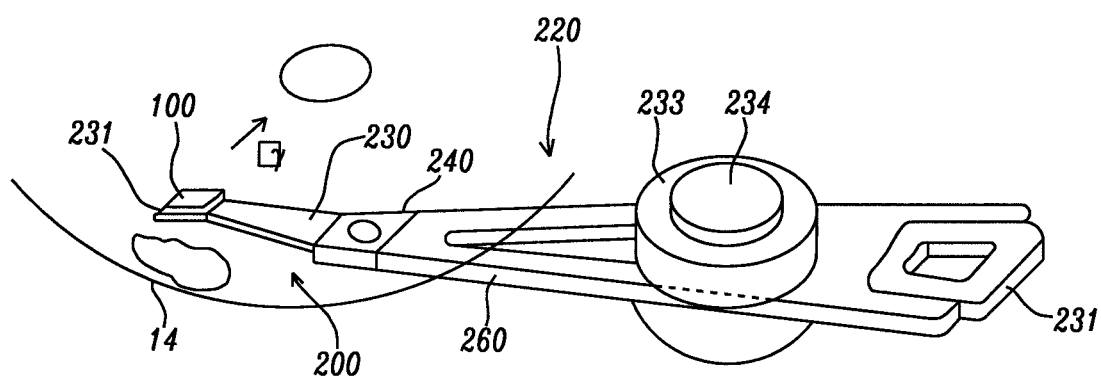
FIG. 9 schematically shows a perspective view of a head arm assembly of the present recording apparatus.
Figure 10:
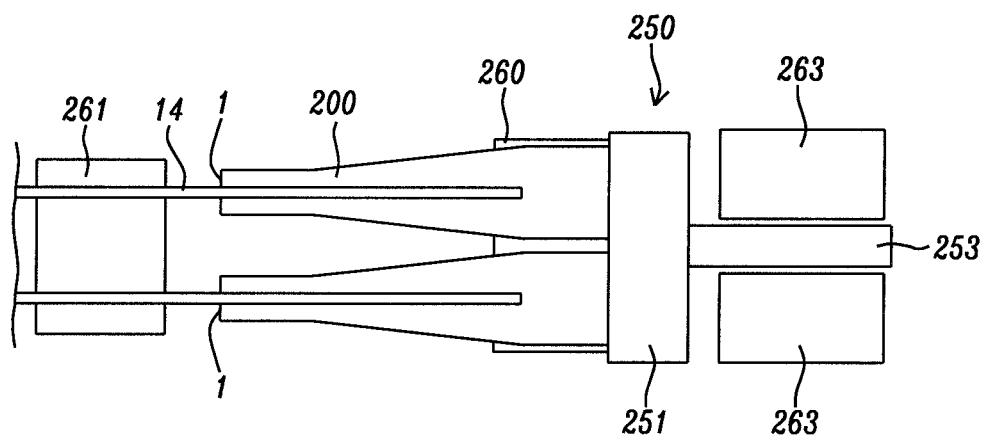
FIG. 10 schematically shows a side view of a head stack assembly of the present recording apparatus.
Figure 11:
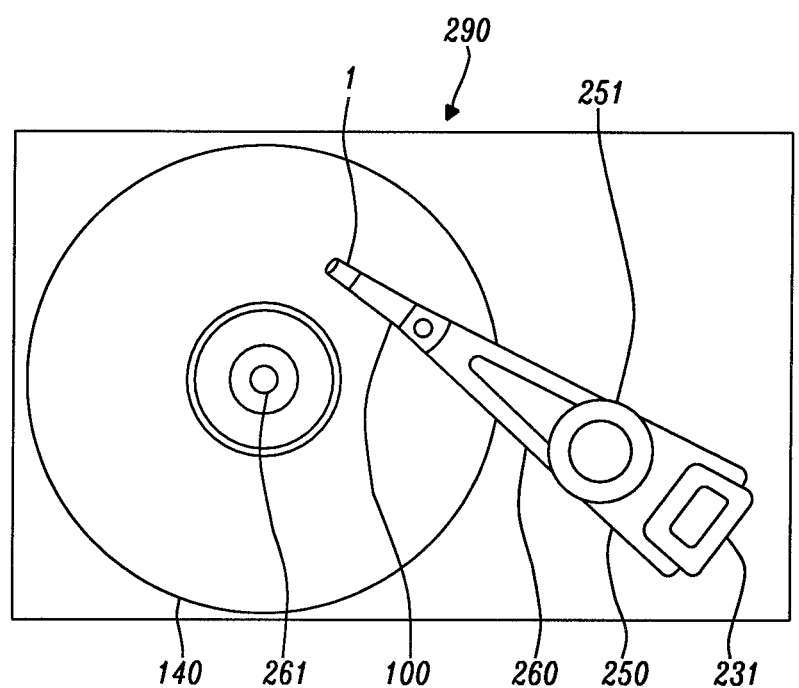
FIG. 11 schematically shows a plan view of the magnetic recording apparatus within which are mounted the components shown if FIGS. 8 and 9.

Referring finally to FIGS. 8, 9 and 10, there is shown an exemplary magnetic recording apparatus, such as a TAMR configured hard disk drive (HDD), through whose use the PMR read/write head configured for TAMR described above will meet the objects of this disclosure.

FIG. 8 shows a head gimbal assembly (HGA) 200 that includes the slider-mounted PMR read/write head 100 and a suspension 220 that elastically supports the head 100. The suspension 220 has a spring-like load beam 230 made with a thin, corrosion-free elastic material like stainless steel. A flexure 231 is provided at a distal end of the load beam and a base-plate 240 is provided at the proximal end. The TAMR 100 is attached to the load beam 230 at the flexure 231 which provides the TAMR with the proper amount of freedom of motion. A gimbal part for maintaining the PMR read/write head at a proper level is provided in a portion of the flexure 231 to which the TAMR 100 is mounted.

A member to which the HGA 200 is mounted to arm 260 is referred to as head arm assembly 220. The arm 260 moves the read/write head 100 in the cross-track direction y across the medium 14 (here, a hard disk). One end of the arm 260 is mounted to the base plate 240. A coil 231 to be a part of a voice coil motor is mounted to the other end of the arm 260. A bearing part 233 is provided to the intermediate portion of the arm 260. The arm 260 is rotatably supported by a shaft 234 mounted to the bearing part 233. The arm 260 and the voice coil motor that drives the arm 260 configure an actuator.

Referring next to FIG. 9 and FIG. 10, there is shown a head stack assembly and a magnetic recording apparatus in which the read/write head 100 is contained. The head stack assembly is an element to which the HGA 200 is mounted to arms of a carriage having a plurality of arms. FIG. 9 is a side view of this assembly and FIG. 10 is a plan view of the entire magnetic recording apparatus.

A head stack assembly 250 has a carriage 251 having a plurality of arms 260. The HGA 200 is mounted to each arm 260 at intervals to be aligned in the vertical direction. A coil 231 (see FIG. 8), which is to be a portion of a voice coil motor is mounted at the opposite portion of the arm 260 in the carriage 251. The voice coil motor has a permanent magnet 263 arranged at an opposite location across the coil 231.

Based on the modeling results shown in the figures, we see that this design offers many advantages, including:
1) Control of contact area magnitude to prevent TD "overpush" (overcompensation of heater power due to poor detection of TD) by bumper's dimension and protrusion.
2) Control of minimum point shift away from sensor, to bumper pads, for head reliability.
3) Adjustability of bumper local protrusion height and shape by choice of bumper dimension for different wafer designs, head processes and write conditions.

As is understood by a person skilled in the art, the present description is illustrative of the present disclosure rather than limiting of the present disclosure. Revisions and modifications may be made to methods, materials, structures and dimensions employed in forming and providing a HDD slider-mounted PMR recording head configured for TAMR, the slider having an ABS topography that includes active bumper pads symmetrically or asymmetrically surrounding a narrow writer region that is configured to operate in conjunction with a plasmon near-field spot and wherein the bumpers provide shape alterations, resulting from thermal protrusion effects generated within said PMR, where the shape alterations provide protection to portions of said PMR head during intentional and unintentional TDs while still forming and providing such a device and its method of operation in accord with the spirit and scope of the present disclosure as defined by the appended claims.

What is claimed is:
1. A TAMR read/write head comprising:
a perpendicular magnetic recording (PMR) read/write head configured for TAMR (Thermally Assisted Magnetic Recording); wherein
said PMR read/write head further comprises a magnetically shielded giant magnetoresistive (GMR) read head and a separate, magnetically shielded inductive write head that is activated by a write current, said read head and write head emerging at an air bearing surface (ABS) of said PMR; wherein;
independently operating heater elements, Hr and Hw, are disposed adjacent to said read head and said write head respectively, but are proximally away from said ABS; wherein
at least one head-disk interference sensor (HDIs) is mounted in said read/write head; and wherein
said write head forms a narrow writing region at said ABS and wherein magnetic flux is emitted by an emergent magnetic pole tip at said ABS and wherein near-field plasmon energy emerges at a trailing edge of said pole tip to enable writing on a disk medium; and wherein
a pair of thermally active bumper pads, extending distally away from said ABS and configured to absorb thermal energy generated from said heaters, from said write current and from said TAMR apparatus, whereby the shapes of said bumper pads are modified by local thermally-induced protrusions and wherein said bumper pads thermally protrude to provide increased surface area of said ABS of said write head and enhanced protection to said write head; wherein
said bumper pads are disposed to either side of said narrow writing region of said write element to protect said region in the event of a touchdown (TD) or other forms of head-disk interference (HDI) by shifting points of possible disk contacts towards said shields.

2. The TAMR read/write head of claim 1 wherein both said active bumper pads are identically shaped, whereby each said active bumper pad produces a similar protrusion as said other active bumper pad when thermally activated, thereby altering the response of said slider symmetrically in a cross-track direction under conditions of a TD.

3. The TAMR read/write head of claim 1 wherein both said active bumper pads are identically shaped with triangular surfaces extending proximally rearward away from said ABS and passing over inductive magnetic coil elements whereby each said active bumper pad absorbs heat generated by said magnetic coil elements during write processes.

4. The TAMR read/write head of claim 1 wherein each said active bumper pad is shaped differently from the other, whereby each said active bumper pad produces a differently shaped protrusion from said other active bumper pad when thermally activated, thereby altering the response of said slider under conditions of a TD in an asymmetric manner.

5. The TAMR read/write head of claim 1 wherein said thermally active bumper pads are formed of the conductive material NiFe, whereby sharp thermal gradients in said active bumper pads are mitigated and the thermal protrusion profiles are accurately calculated using mathematical simulation methods.

6. The TAMR read/write head of claim 1 wherein, during a TD, said thermally active bumper pads shift the point of minimum approach to said disk medium of said slider ABS away from said HDIs and to said active bumper pads, to improve both TD detection and head reliability.

7. The TAMR read/write head of claim 1 whereby adjusting the size and shape of each said active bumper pad makes said active bumper pads adaptable to different head designs, write conditions and head fabrication processes.

8. A slider-mounted TAMR read/write head comprising:
said TAMR read/write head of claim 1 mounted on a slider, said slider being aerodynamically configured to maintain said TAMR read/write head at a fly height when said slider is suspended above a rotating magnetic recording disk and wherein thermal protrusions of said active bumper pads control a minimum fly height point of said slider during TD events.

9. The slider mounted TAMR read/write head of claim 8 wherein thermal protrusions caused by said active bumper pads increase the area of said slider ABS in closest approach of a disk medium during a touchdown (TD) event, whereby said HDIs are brought uniformly closer to said disk medium and said TD event is more easily detected by said HDIs.

10. The slider mounted TAMR read/write head of claim 8 wherein said active bumper pads shift the point of minimum approach to TD of said slider ABS away from sensitive regions exposed on said ABS to larger shields and, therefore, to improve head reliability.

11. A head gimbal assembly, comprising
the slider-mounted TAMR read/write head of claim 8;
a suspension that elastically supports said slider-mounted TAMR read/write head, wherein
said suspension has a flexure to which said slider-mounted TAMR read/write head is joined, a load beam with one end connected to said flexure and a base plate connected to the other end of said load beam.

12. A hard disk drive (HDD), comprising:
said head gimbal assembly of claim 11;
a magnetic recording medium positioned opposite to said slider-mounted TAMR;
a spindle motor that rotates and drives said magnetic recording medium;
a device that supports the slider and that positions said slider relative to said magnetic recording medium.

* * * * *